(12) United States Patent
Lai et al.

(10) Patent No.: US 11,874,410 B2
(45) Date of Patent: Jan. 16, 2024

(54) RADIATION DETECTION DEVICE

(71) Applicant: InnoCare Optoelectronics Corporation, Tainan (TW)

(72) Inventors: Chun-Fu Lai, Tainan (TW); Shun-Cheng Cheng, Tainan (TW)

(73) Assignee: InnoCare Optoelectronics Corporation, Tainan (TW)

( * ) Notice: Subject to any disclaimer, the term of this patent is extended or adjusted under 35 U.S.C. 154(b) by 201 days.

(21) Appl. No.: 17/319,117

(22) Filed: May 13, 2021

(65) Prior Publication Data
US 2021/0389477 A1 Dec. 16, 2021

(30) Foreign Application Priority Data
Jun. 11, 2020 (TW) .................................. 109119599

(51) Int. Cl.
*G01T 1/17* (2006.01)
*H04N 5/32* (2023.01)
*G01T 7/00* (2006.01)
*H04N 25/671* (2023.01)

(52) U.S. Cl.
CPC ............... *G01T 1/17* (2013.01); *G01T 7/005* (2013.01); *H04N 5/32* (2013.01); *H04N 25/671* (2023.01)

(58) Field of Classification Search
CPC .................................. G01T 1/17; G01T 7/005
See application file for complete search history.

(56) References Cited

U.S. PATENT DOCUMENTS

| | | | |
|---|---|---|---|
| 6,724,855 B2 * | 4/2004 | Sugawara ............ | G01T 1/2928 250/580 |
| 8,748,835 B2 * | 6/2014 | Lim ...................... | G01T 1/2018 250/370.09 |
| 10,914,849 B2 * | 2/2021 | Ofuji ....................... | H04N 5/32 |

FOREIGN PATENT DOCUMENTS

| | | | | |
|---|---|---|---|---|
| CN | 1183390 | | 1/2005 | |
| CN | 104427937 | | 1/2018 | |
| JP | 2012090032 | | 5/2012 | |
| JP | 2016111432 | A * | 6/2016 | ............... H04N 5/32 |
| TW | 201213838 | | 4/2012 | |

OTHER PUBLICATIONS

Canon Inc—JP 2016-111432 A—Google Patents English obtained Jan. 19, 2023 (Year: 2023).*

* cited by examiner

*Primary Examiner* — David P Porta
*Assistant Examiner* — Casey Bryant
(74) *Attorney, Agent, or Firm* — JCIPRNET

(57) ABSTRACT

A radiation detection device, including a detection panel, is provided. The detection panel includes multiple first pixels, arranged into a first row in an extending direction of a data line; multiple second pixels, arranged into a second row in the extending direction of the data line; and multiple other second pixels, arranged into a third row in the extending direction of the data line. Each of the multiple first pixels includes a first switch. Each of the multiple second pixels and the multiple other second pixels includes a second switch. Each of the multiple second pixels and the multiple other second pixels includes a photodiode. The multiple first pixels do not include a photodiode. That is, compared with the multiple first pixels, each of the multiple second pixels further includes the photodiode electrically connected with the second switch.

8 Claims, 4 Drawing Sheets

RADIATION DETECTION DEVICE

CROSS-REFERENCE TO RELATED APPLICATION

This application claims the priority benefit of Taiwan application serial no. 109119599, filed on Jun. 11, 2020. The entirety of the above-mentioned patent application is hereby incorporated by reference herein and made a part of this specification.

BACKGROUND OF THE INVENTION

1. Field of the Invention

The disclosure relates to detection equipment, and more particularly to a radiation detection device.

2. Description of Related Art

Processing of removing a basic offset of a general radiation detection device is generally influenced by dynamic factors, including variations of an analog-to-digital converter of a readout circuit chip, or power supply noise from a gate end and the like, and even mode switching of the readout circuit chip may influence an operating temperature to further influence a detection value. In other words, due to the influence by the above dynamic factors, in the process of obtaining the basic offset information by the general radiation detection device, there is actually a difference between the obtained basic offset information and detected exposure information. Therefore, a general correction mode is to avoid the influence of exposure only in a mode of shielding a photodiode, but since a circuit loop connected with the photodiode theoretically has influence of dark current or other defects, the general radiation detection device is incapable of providing proper basic offset information. In view of this, solutions to a plurality of embodiments are provided below.

SUMMARY OF THE INVENTION

The disclosure is directed to a radiation detection device capable of effectively obtaining background noise to correct a radiation detection result.

According to embodiments of the disclosure, the radiation detection device of the disclosure includes a detection panel. The detection panel includes a plurality of first pixels, arranged into a first row in an extending direction of a data line; a plurality of second pixels, arranged into a second row in the extending direction of the data line; and a plurality of other second pixels, arranged into a third row in the extending direction of the data line. Each of the plurality of first pixels includes a first switch. Additionally, each of the plurality of second pixels and the plurality of other second pixels includes a second switch. Each of the plurality of second pixels and the plurality of other second pixels includes a photodiode. Additionally, the plurality of first pixels do not include a photodiode. That is, compared with the plurality of first pixels, each of the plurality of second pixels and the plurality of other second pixels further includes a photodiode electrically connected with the second switch.

According to embodiments of the disclosure, the radiation detection device of the disclosure includes a detection panel. The detection panel includes a bias line, first pixels and second pixels. Each of the first pixels and the second pixels respectively includes a switch and a photodiode. The plurality of first pixels are electrically insulated from the bias line. The plurality of second pixels are electrically connected with the bias line.

Based on the above, the radiation detection device of the disclosure may provide proper background noise through the pixels without the photodiode or the pixels electrically insulated from the bias line, so as to effectively obtain the background noise to correct a radiation detection result.

To make the features and advantages of the invention clear and easy to understand, the following gives a detailed description of embodiments with reference to accompanying drawings.

DESCRIPTION OF THE EMBODIMENTS

Some words are used to refer to specific components in the whole specification and the claims in the disclosure. A person skilled in the art should understand that a display device manufacturer may use different names to refer to the same components. This specification is not intended to distinguish components that have the same functions but different names. In this specification and the claims, words such as "have" and "include" are open words, and should be interpreted as "including, but not limited to".

In some embodiments of the disclosure, terms such as "connect" and "interconnect" with regard to bonding and connection, unless specifically defined, may mean that two structures are in direct contact, or may mean that two structures are not in direct contact, and there is another structure between the two structures. The terms with regard to bonding and connection may also include a case where both structures are movable or both structures are fixed. In addition, the term "electrical connection" includes any direct and indirect means of electrical connection.

Ordinal numbers used in this specification and the claims, like "first" and "second", are used to modify the components, and do not imply or represent that the (or these) component (or components) has (or have) any ordinal number, and do not indicate any order between a component and another component, or an order in a manufacturing method. These ordinal numbers are merely used to clearly distinguish a component having a name with another component having the same name. Different terms may be used in the claims and the specification, so that a first component in the specification may be a second component in the claims. It should be noted that, technical features in several different embodiments may be replaced, recombined, or mixed to form other embodiments without departing from the spirit of the disclosure.

Figure 1:
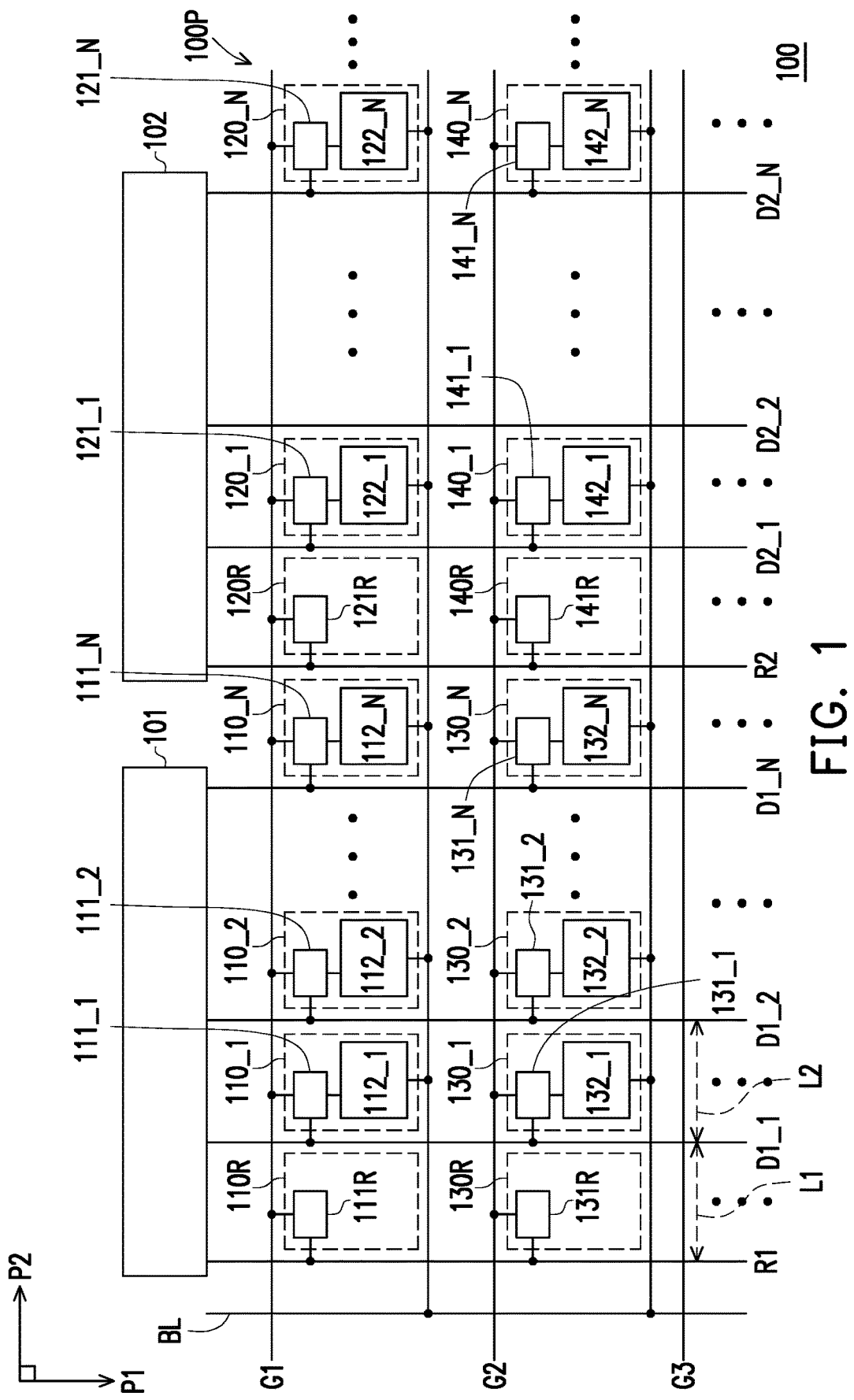
FIG. 1 is a schematic circuit diagram of a radiation detection device according to some embodiments of the disclosure.

FIG. 1 is a schematic circuit diagram of a radiation detection device according to a first embodiment of the disclosure. Referring to FIG. 1, a radiation detection device 100 includes a detection panel 100P. The detection panel 100P includes a pixel array. Additionally, FIG. 1 shows a portion of the pixel array of the detection panel 100P. In the present embodiment, the detection panel 100P includes readout circuits 101 and 102, and includes gate lines G1, G2 and G3, a bias line BL, background lines R1 and R2, data lines D1_1 to D1_N and D2_1 to D2_N, and pixels 110R, 110_1 to 110_N, 120R, and 120_1 to 120_N. N is a positive integer. The pixels 110R, 110_1 to 110_N, 120R, and 120_1 to 120_N are arranged in an extending direction P2 of the gate lines. In other embodiments, the gate lines may be linear or mostly linear or nonlinear (for example, wavy), and the disclosure is not limited thereto. Therefore, no matter the gate lines are linear or mostly linear or nonlinear, extending is performed in the extending direction P2 of the gate lines. Pixels 130R, 130_1 to 130_N, 140R, and 140_1 to 140_N are arranged in the extending direction P2 of the gate lines. The pixels 110R, 110_1 to 110_N, 120R, and 120_1 to 120_N are disposed between the gate lines G1 and G2. The pixels 130R, 130_1 to 130_N, 140R, and 140_1 to 140_N are disposed between the gate lines G2 and G3. In the present embodiment, the readout circuit 101 is electrically connected with the background line R1 and the data lines D1_1 to D1_N, and reads out detection data of the pixels 110R, 110_1 to 110_N, 130R, and 130_1 to 130_N through the background line R1 and the data lines D1_1 to D1_N. The readout circuit 102 is electrically connected with the background line R2 and the data lines D2_1 to D2_N, and reads out detection data of the pixels 120R, 120_1 to 120_N, 140R, and 140_1 to 140_N through the background line R2 and the data lines D2_1 to D2_N.

In the present embodiment, the pixels 110R, 110_1 to 110_N, 120R, and 120_1 to 120_N respectively include switches 111R, 111_1 to 111_N, 121R, and 121_1 to 121_N. Additionally, the switches 111R, 111_1 to 111_N, 121R, and 121_1 to 121_N are electrically connected with the gate line G1. The pixels 130R, 130_1 to 130_N, 140R, and 140_1 to 140_N respectively include switches 131R, 131_1 to 131_N, 141R, and 141_1 to 141_N. Additionally, the switches 131R, 131_1 to 131_N, 141R, and 141_1 to 141_N are electrically connected with the gate line G2. The gate line G3 is configured to electrically connect a plurality of pixels (not shown) arranged in a next row in the extending direction P2 of the gate lines. Each of the switches 111R, 111_1 to 111_N, 121R, 121_1 to 121_N, 131R, 131_1 to 131_N, 141R, and 141_1 to 141_N may respectively include one or a plurality of switching circuits formed by N-type or P-type transistors, and the disclosure is not limited thereto. The pixels 110_1 to 110_N, 120_1 to 120_N, 130_1 to 130_N, and 140_1 to 140_N also respectively include photodiodes 112_1 to 112_N, 122_1 to 122_N, 132_1 to 132_N, and 142_1 to 142_N.

It is worth noting that the above photodiodes are light detection devices capable of converting light into current, voltage or capacitance signals according to use modes. Additionally, after the photodiodes detect light, the current, voltage or capacitance signals are provided to the readout circuits 101 and 102 through the data lines to perform relevant signal interpretation. In the present embodiment, the photodiodes 112_1 to 112_N, 122_1 to 122_N, 132_1 to 132_N, and 142_1 to 142_N are respectively and electrically connected with the switches 111_1 to 111_N, 121_1 to 121_N, 131_1 to 131_N, and 141_1 to 141_N, and are electrically connected with the bias line BL. The bias line BL is configured to provide an operating voltage to the photodiodes 112_1 to 112_N, 122_1 to 122_N, 132_1 to 132_N, and 142_1 to 142_N.

From another perspective, the plurality of pixels such as pixels 110R and 130R are arranged into a first row in an extending direction P1 of the data line. The plurality of pixels such as pixels 110_1 and 130_1 are arranged into a second row in the extending direction P1 of the data line. Additionally, the plurality of pixels such as pixels 110_2 and 130_2 are arranged into a third row in the extending direction P1 of the data line. In other embodiments, the data line may be linear or mostly linear or nonlinear (for example, wavy), and the disclosure is not limited thereto. Therefore, no matter the data line is linear or mostly linear or nonlinear, extending is performed in the extending direction P1 of the data line. In the present embodiment, each of the plurality of pixels in the first row includes a switch, for example, the pixels 110R and 130R include switches 111R or 131R. Additionally, each of the plurality of pixels in the first row, for example, the pixels 110R and 130R, does not include a photodiode. Each of the pixels 110_1, 130_1, 110_2 and 130_2 includes a photodiode 112_1, 132_1, 112_2 and 132_2. That is, compared with the pixels 110R and 130R, each of the pixels 110_1, 130_1, 110_2 and 130_2 includes the photodiode 112_1, 132_1, 112_2 and 132_2 respectively and electrically connected with the switch 111_1, 131_1, 111_2 and 131_2. The switches 111R and 131R are electrically connected with the background line R1.

In the present embodiment, each of the plurality of pixels in the second row includes a switch and a photodiode, for example, the pixels 110_1 and 130_1 include switches 111_1 and 131_1 and photodiodes 112_1 and 132_1. The switch 111_1 is electrically connected with the gate line G1, the data line D1_1 and the photodiode 112_1. Additionally, the photodiode 112_1 is also electrically connected with the bias line BL. The switch 131_1 is electrically connected with the gate line G2, the data line D1_1 and the photodiode 132_1. Additionally, the photodiode 132_1 is also electrically connected with the bias line BL.

In the present embodiment, each of the plurality of pixels in the third row includes a switch and a photodiode, for example, the pixels 110_2 and 130_2 include switches 111_2 and 131_2 and photodiodes 112_2 and 132_2. The switch 111_2 is electrically connected with the gate line G1, the data line D1_2 and the photodiode 112_2. Additionally, the photodiode 112_2 is also electrically connected with the bias line BL. The switch 131_2 is electrically connected with the gate line G2, the data line D1_2 and the photodiode 132_2. Additionally, the photodiode 132_2 is also electrically connected with the bias line BL. The data line D1_2 is close to the data line D1_1 and away from the background line R1. It is worth noting that the statement that the data line D1_2 is close to the data line D1_1 refers to that there is no other data line or background line between the data line D1_1 and the data line D1_2.

In the present embodiment, the radiation detection device 100 may obtain a plurality of offsets in the radiation detection process through each of the plurality of pixels in the first row including, for example, the pixels 110R, 120R, 130R and 140R, so as to respectively correct the radiation detection results of the photodiodes of the pixels in other corresponding rows.

Additionally, in the present embodiment, a minimum distance L1 between the background line R1 and the data line D1_1 is identical to a minimum distance L2 between the data line D1_1 and the data line D1_2. Identically, a minimum distance between the background line R2 and the data line D2_1 is also identical to a minimum distance between the data line D2_1 and the data line D2_2. In other words, the radiation detection device 100 may be, for example, photodiodes of removing the pixels 110R, 120R, 130R and 140R from an existing pixel array layout, so that the switches 111R, 121R, 131R and 141R of the pixels 110R, 120R, 130R and 140R only provide noise signals on a circuit loop to the readout circuits 101 and 102 to be used as the offsets.

It is worth noting that the background line R1, the data line D1_1 and the data line D1_2 are electrically connected with the same readout circuit 101, so that identical or similar circuit loop noise is realized among the pixels 110R, 110_1 to 110_N, 130R, and 130_1 to 130_N. The background line R2, the data line D2_1 and the data line D2_2 are electrically connected with the same readout circuit 102, so that identical or similar circuit loop noise is realized among the pixels 120R, 120_1 to 120_N, 140R, and 140_1 to 140_N. Therefore, the offsets read out from the switches 111R and 131R are applicable to correction of the detection results of the pixels 110_1 to 110_N, and 130_1 to 130_N. Additionally, the offsets read out from the switches 121R and 141R are applicable to correction of the detection results of the pixels 120_1 to 120_N, and 140_1 to 140_N.

Additionally, in some embodiments, the pixels 110_1 to 110_N electrically connected to the readout circuit 101 may also include one or a plurality of pixel designs such as the pixel 110R for obtaining the background noise. Additionally, the pixels 130_1 to 130_N electrically connected to the readout circuit 101 may also include one or a plurality of pixel designs such as the pixel 130R for obtaining the offsets. In other words, any one or a plurality of data lines can be selected from the data lines D1_1 to D1_N to be used as the background lines. However, the positions of one or a plurality of pixels, such as the pixel 110R, designed in the pixels 110_1 to 110_N, and 131_1 to 131_N may be equidistant or non-equidistant or optionally selected. By taking three background lines as examples, a first background line, a second background line and a third background line are electrically connected to the readout circuit 101. A minimum distance between the first background line and the second background line may be identical to a minimum distance between the second background line and the third background line, or the minimum distance between the first background line and the second background line may be different from the minimum distance between the second background line and the third background line. Identically, the pixels 120_1 to 120_N, and 140_1 to 140_N electrically connected to the readout circuit 102 may adopt a circuit layout mode identical to, similar to or different from that of the pixels 110_1 to 110_N, and 130_1 to 130_N electrically connected to the readout circuit 101 according to different use requirements or designs.

Additionally, the radiation detection device 100 may include display equipment, an antenna device, a sensing device or a splicing device, but it is not limited thereto. The radiation detection device 100 may be a bendable or flexible electronic device. The radiation detection device 100 may include, for example, a liquid crystal light emitting diode (LED). The LED may include, for example, an organic light emitting diode (OLED), a mini LED, a micro LED or a quantum dot LED (QDLED), and may include fluorescence, phosphor or other proper materials, and the materials may be freely arranged and combined, but it is not limited thereto. The antenna device may be, for example, a liquid crystal antenna, but it is not limited thereto. The splicing device may be, for example, a display splicing device or an antenna splicing device, but it is not limited thereto. It should be noted that the radiation detection device 100 may be any above arrangement and combination, but it is not limited thereto.

Figure 2:
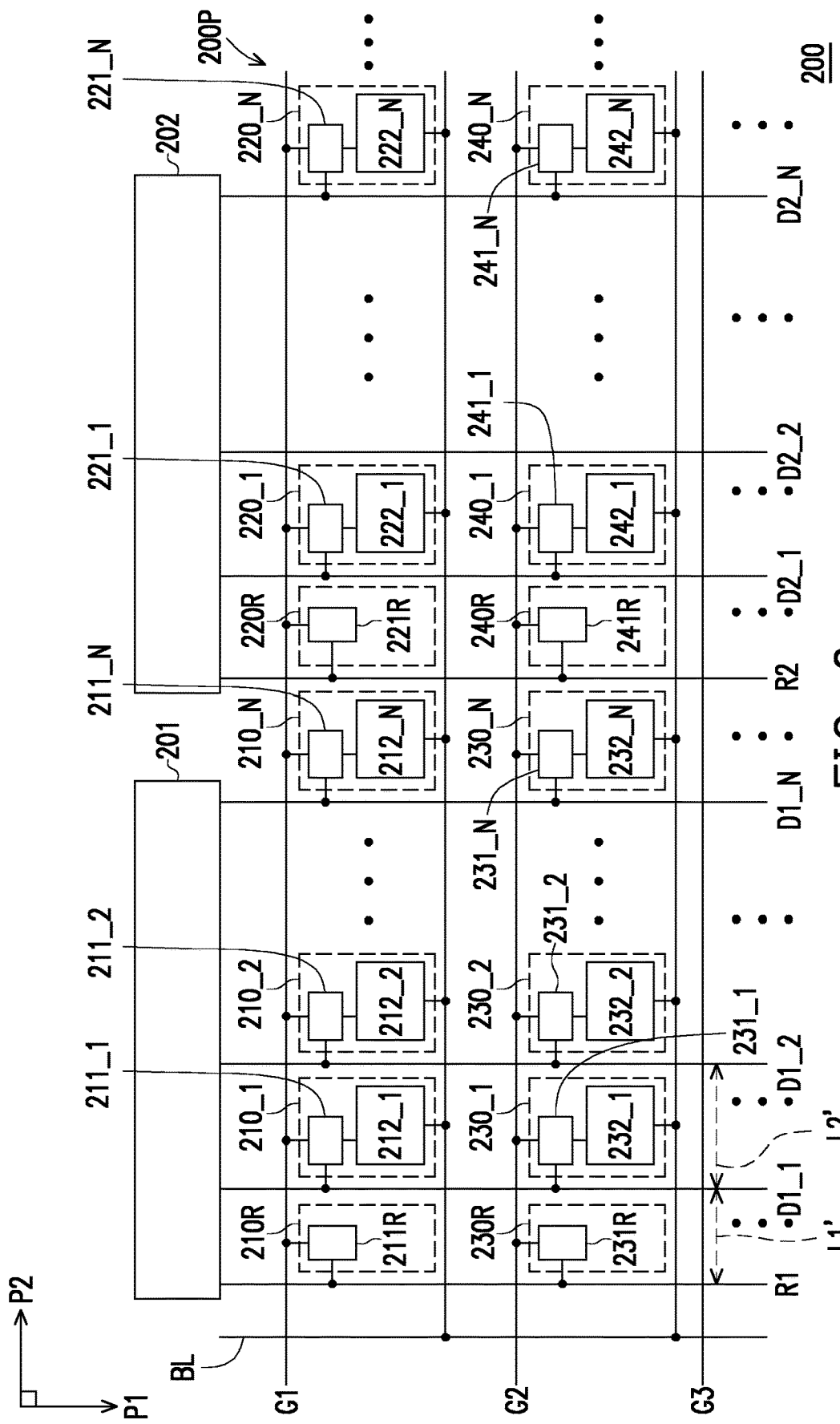
FIG. 2 is a schematic circuit diagram of a radiation detection device according to some embodiments of the disclosure.

FIG. 2 is a schematic circuit diagram of a radiation detection device according to some embodiments of the disclosure. Referring to FIG. 2, a radiation detection device 200 includes a detection panel 200P. The detection panel 200P includes a pixel array. Additionally, FIG. 2 shows a portion of the pixel array of the detection panel 200P. In the present embodiment, the detection panel 200P includes readout circuits 201 and 202, and includes gate lines G1, G2 and G3, a bias line BL, background lines R1 and R2, data lines D1_1 to D1_N, and D2_1 to D2_N, and pixels 210R, 210_1 to 210_N, 220R, 220_1 to 220_N, 230R, 230_1 to 230_N, 240R, and 240_1 to 240_N. N is a positive integer. The pixels 210R, 210_1 to 210_N, 220R, and 220_1 to 220_N are arranged in an extending direction P2 of the gate lines, and are disposed between the gate lines G1 and G2. The pixels 230R, 230_1 to 230_N, 240R, and 240_1 to 240_N are arranged in the extending direction P2 of the gate lines, and are disposed between the gate lines G2 and G3. In the present embodiment, the readout circuit 201 is electrically connected with the background line R1 and the data lines D1_I to D1_N, and reads out detection data of the pixels 210R, 210_1~210_N, 230R, 230_1 to 230_N through the background line R1 and the data lines D1_1 to D1_N. The readout circuit 202 is electrically connected with the background line R2 and the data lines D2_1 to D2_N, and reads out detection data of the pixels 220R, 220_1 to 220_N, 240R, and 240_1 to 240_N through the background line R2 and the data lines D2_1 to D2_N.

In the present embodiment, the pixels 210R, 210_1 to 210_N, 220R, 220_1 to 220_N, 230R, 230_1 to 230_N, 240R, and 240_1 to 240_N respectively include switches 211R, 211_1 to 211_N, 221R, 221_1 to 221_N, 231R, 231_1 to 231_N, 241R, and 241_1 to 241_N. The switches 211R, 211_1 to 211_N, 221R, and 221_1 to 221_N are electrically connected with the gate line G1. The switches 231R, 231_1 to 231_N, 241R, and 241_1 to 241_N are electrically connected with the gate line G2. The gate line G3 is configured to electrically connect a plurality of pixels (not shown) of a next row arranged in the extending direction P2 of the gate lines. The switches 211R, 211_1 to 211_N, 221R, 221_1 to 221_N, 231R, 231_1 to 231_N, 241R, and 241_1 to 241_N may respectively include one or a plurality of switching circuits formed by N-type or P-type transistors, and the disclosure is not limited thereto. The pixels 210_1 to 210_N, 220_1 to 220_N, 230_1 to 230_N, and 240_1 to 240_N further and respectively include photodiodes 212_1 to 212_N, 222_1 to 222_N, 232_1 to 232_N, and 242_1 to 242_N. Additionally, the photodiodes 212_1 to 212_N, 222_1 to 222_N, 232_1 to 232_N, and 242_1 to 242_N are respectively and electrically connected with the switches 211_1 to 211_N, 221_1 to 221_N, 231_1 to 231_N, and 241_1 to 241_N, and electrically connected with the bias line BL. The bias line BL is configured to provide an operating voltage to the photodiodes 212_1 to 212_N, 222_1 to 222_N, 232_1 to 232_N, and 242_1 to 242_N.

From another perspective, the plurality of pixels such as the pixels 210R and 230R are arranged into a first row in an extending direction P1 of the data line. The plurality of pixels such as the pixels 210_1 and 230_1 are arranged into a second row in the extending direction P1 of the data line. Additionally, the plurality of pixels such as the pixels 210_2 and 230_2 are arranged into a third row in the extending direction P1 of the data line. In the present embodiment, each of the plurality of pixels in the first row includes a switch, for example, the pixels 210R and 230R include switches 211R and 231R. Additionally, each of the plurality of pixels in the first row, for example, the pixels 210R and 230R, does not include a photodiode. The switch 211R is electrically connected with the gate line G1 and the background line R1. The switch 231R is electrically connected with the gate line G2 and the background line R1. In the present embodiment, each of the plurality of pixels in the second row includes a switch and a photodiode, for example, the pixels 210_1 and 230_1 include switches 211_1 and 231_1 and photodiodes 212_1 and 232_1. The switch 211_1 is electrically connected with the gate line G1, the data line D1_1 and the photodiode 212_1. Additionally, the photodiode 212_1 is also electrically connected with the bias line BL. The switch 231_1 is electrically connected with the gate line G2, the data line D1_1 and the photodiode 232_1. Additionally, the photodiode 232_1 is also electrically connected with the bias line BL. In the present embodiment, each of the plurality of pixels in the third row includes a switch and a photodiode, for example, the pixels 210_2 and 230_2 include switches 211_2 and 231_2 and photodiodes 212_2 and 221_2. The switch 211_2 is electrically connected with the gate line G1, the data line D1_2 and the photodiode 212_2. Additionally, the photodiode 212_2 is also electrically connected with the bias line BL. The switch 231_2 is electrically connected with the gate line G2, the data line D1_2 and the photodiode 232_2. Additionally, the photodiode 232_2 is also electrically connected with the bias line BL. The data line D1_2 is close to the data line D1_1 and away from the background line R1.

In the present embodiment, the radiation detection device 200 may obtain a plurality of offsets in the radiation detection process through each of the plurality of pixels in the first row including, for example, the pixels 210R, 220R, 230R and 240R, so as to respectively correct the radiation detection results of the photodiodes of the other corresponding pixels. Additionally, in the present embodiment, a minimum distance L1' between the background line R1 and the data line D1_1 is different from a minimum distance L2' between the data line D1_1 and the data line D1_2. Identically, a minimum distance between the background line R2 and the data line D2_1 is also different from a minimum distance between the data line D2_1 and the data line D2_2. In the present embodiment, a ratio of the minimum distance L2' between the data line D1_1 and the data line D1_2 to the minimum distance between the background line R1 and the data line D1_1 is, for example, greater than 6, but the disclosure is not limited thereto. In other words, in an embodiment, the radiation detection device 200 may be, for example, photodiodes of removing the pixels 210R, 220R, 230R and 240R by changing an existing pixel array layout, so that the switches 211R, 212R, 231R and 242R of the pixels 210R, 220R, 230R and 240R only provide noise signals on a circuit loop to the readout circuits 201 and 202 to be used as the offsets. Additionally, the radiation detection device 200 may perform configuration direction turning (for example, for 90°) on the switches 211R, 221R, 231R and 241R to reduce a layout width of the switches 211R, 221R, 231R and 241R in the extending direction P2 of the gate lines, so that a pixel area not used for radiation detection in the detection panel 200P can be effectively reduced.

It is worth noting that the background line R1 and the data lines D1_1 to D1_N are electrically connected with the same readout circuit 201 so that identical or similar circuit loop noise is realized among the pixels 210R, 210_1 to 210_N, 230R, and 230_1 to 230_N. The background line R2 and the data lines D2_1 to D2_N are electrically connected with the same readout circuit 202 so that identical or similar circuit loop noise is realized among the pixels 220R, 220_1 to 220_N, 240R, and 240_1 to 240_N. Therefore, the offsets read out from the switches 211R and 231R are applicable to correction of the detection results of the pixels 210_1 to 210_N, and 230_1 to 230_N. Additionally, the offsets read out from the switches 221R and 241R are applicable to correction of the detection results of the pixels 220_1 to 220_N, and 240_1 to 240_N.

Additionally, in an embodiment, the pixels 210_1 to 210_N electrically connected to the readout circuit 201 may also include one or a plurality of pixel designs such as the pixel 210R for obtaining the background noise. Additionally, the pixels 230_1 to 230_N electrically connected to the readout circuit 201 may also include one or a plurality of pixel designs such as the pixel 230R for obtaining the background noise. In other words, any one or a plurality of data lines can be selected from the data lines D1_1 to D1_N to be used as the background lines. However, the positions of one or a plurality of pixels, such as the pixels 210R and 230R, designed in the pixels 210_1 to 210_N, and 230_1 to 230_N may be equidistant or non-equidistant or optionally selected. By taking three background lines as examples, a first background line, a second background line and a third background line are electrically connected to the readout circuit 201. A minimum distance between the first background line and the second background line may be identical to a minimum distance between the second background line and the third background line, or the minimum distance between the first background line and the second background line may be different from the minimum distance between the second background line and the third background line. Identically, the pixels 220_1 to 220_N, and 240_1 to 240_N electrically connected to the readout circuit 202 may adopt a circuit layout mode identical to, similar to or different from that of the pixels 210_1 to 210_N, and 230_1 to 230_N electrically connected to the readout circuit 201 according to different use requirements or designs.

Figure 3:
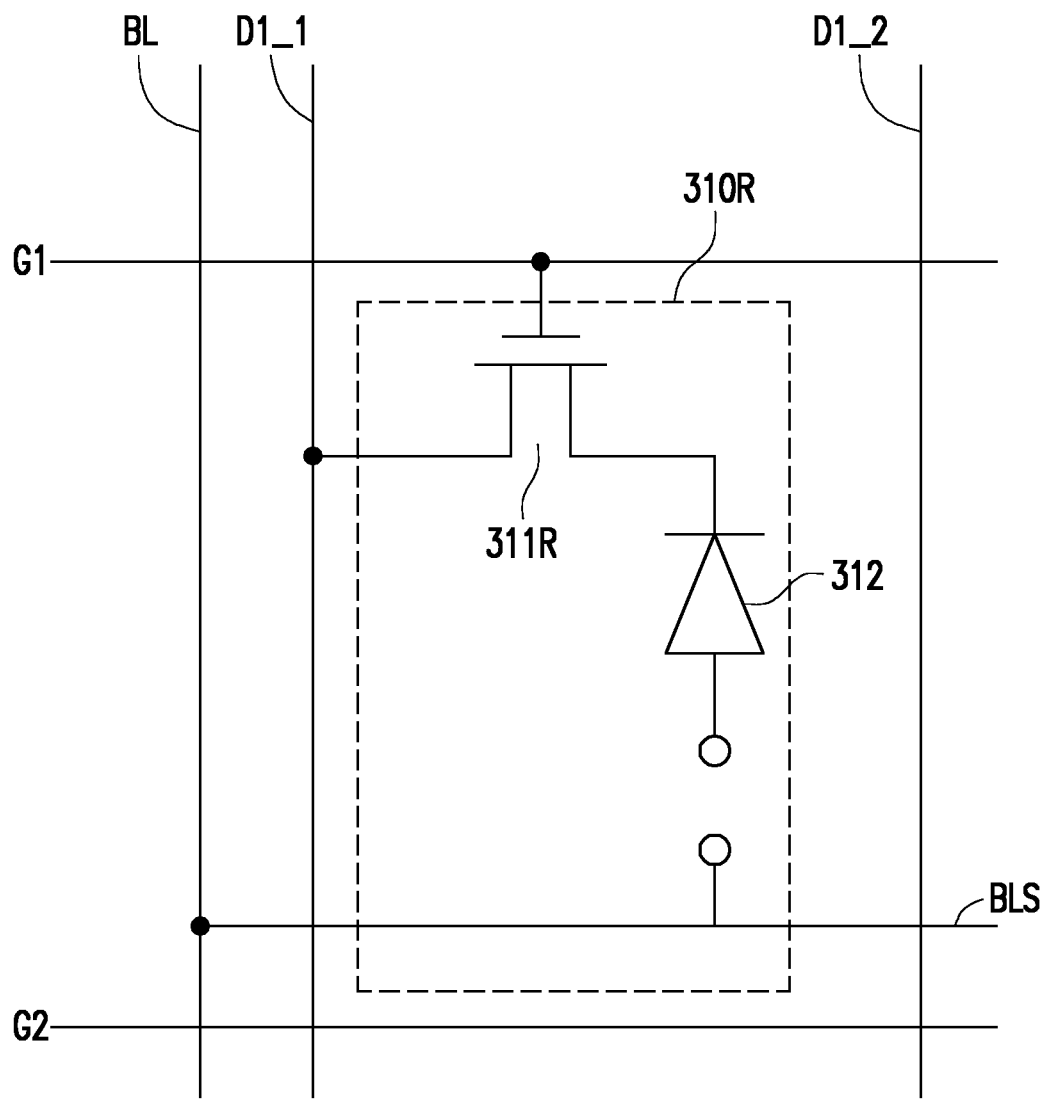
FIG. 3 is a schematic circuit diagram of a pixel according to some embodiments of the disclosure.

FIG. 3 is a schematic circuit diagram of a pixel according to an embodiment of the disclosure. Referring to FIG. 3, FIG. 3 is provided to illustrate an electrical insulation mode of a pixel 310R and the bias line BL. In the present embodiment, the pixel 310R is disposed between the data lines D1_1 and D1_2, and between gate lines G1 and G2. The pixel 310R includes a switch 311R and a photodiode 312. A control end of the switch 311R is electrically connected with the gate line G1. A first end of the switch 311R is electrically connected with the data line D1_1. Additionally, a second end of the switch 311R is electrically connected with one end of the photodiode 312. In the present embodiment, the pixel 310R is electrically insulated from the bias line BL. As shown in FIG. 3, according to the electrical insulation mode of the pixel 310R and the bias line BL, the photodiode 312 is enabled to be incapable of receiving bias to realize energy forbidding in a mode of forming a broken circuit between the photodiode 312 and a bias branch line BLS in an active region. Therefore, after the switch 311R of the pixel 310R is conducted, the background noise of a circuit loop can be provided. However, in an embodiment, according to the electrical insulation mode of the pixel 310R and the bias line BL, the photodiode 312 may also be enabled to be incapable of receiving bias to realize energy forbidding by directly cutting the bias line BL in a peripheral region.

Figure 4:
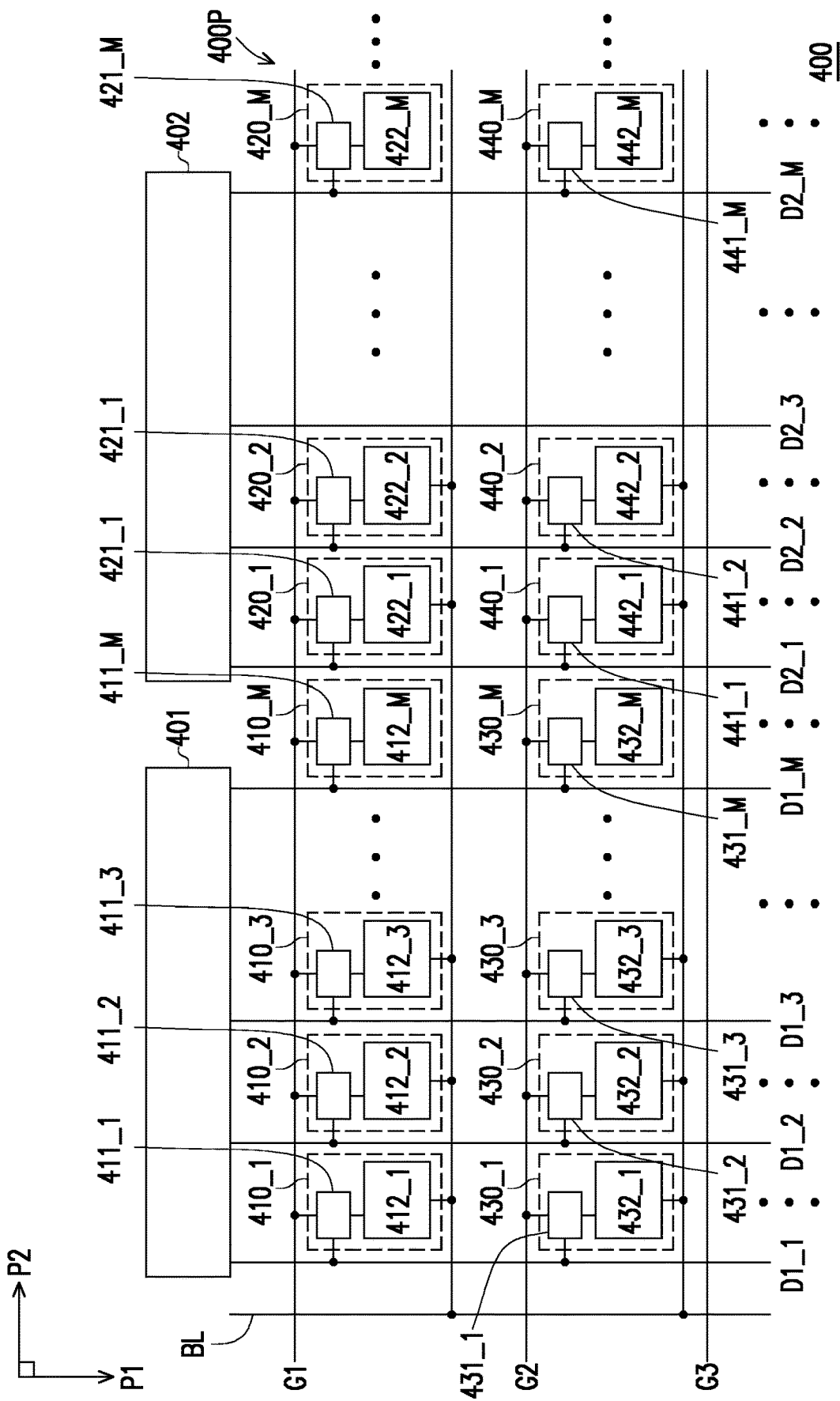
FIG. 4 is a schematic circuit diagram of a radiation detection device according to some embodiments of the disclosure.

FIG. 4 is a schematic circuit diagram of a radiation detection device according to some embodiments of the disclosure. Referring to FIG. 4, a radiation detection device 400 includes a detection panel 400P. The detection panel 400P includes a pixel array. Additionally, FIG. 4 is a portion of the pixel array of the detection panel 400P. In the present embodiment, the detection panel 400P includes readout circuits 401 and 402, and includes a gate line G1, a gate line G2, a gate line G3, a bias line BL, data lines D1_1 to D1_M, and D2_1 to D2_M, and pixels 410_1 to 410_M, 420_1 to 420_M, 430_1 to 430_M, and 440_1 to 440_M. M is a positive integer. The pixels 410_1 to 410_M, and 420_1 to 420_M are arranged in an extending direction P2 of the gate lines, and are disposed between the gate lines G1 and G2. The pixels 430_1 to 430_M, and 440_1 to 440_M are arranged in the extending direction P2 of the gate lines, and are disposed between the gate lines G2 and G3. In the present embodiment, the readout circuit 401 is electrically connected with the data lines D1_1 to D1_M, and is configured to read out detection data of the pixels 410_1 to 410_M, and 430_1 to 430_M through the data lines D1_1 to D1_M. The readout circuit 402 is electrically connected with the data lines D2_1 to D2_M, and is configured to read out detection data of the pixels 420_1 to 420_M, and 440_1 to 440_M through the data lines D2_1 to D2_M.

In the present embodiment, the pixels 410_1 to 410_M, 420_1 to 420_M, 430_1 to 430_M, and 440_1 to 440_M respectively include switches 411_1 to 411_M, 421_1 to 421_M, 431_1 to 431_M, and 441_1 to 441_M. The switches 411_1 to 411_M, and 421_1 to 421_M are electrically connected with the gate line G1. The switches 431_1 to 431_M, and 441_1 to 441_M are electrically connected with the gate line G2. The gate line G3 is configured to electrically connect a plurality of pixels of a next row arranged in the extending direction P2 of the gate lines.

The switches 411_1 to 411_M, 421_1 to 421_M, 431_1 to 431_M, and 441_1 to 441_M may respectively include one or a plurality of switching circuits formed by N-type or P-type transistors, and the disclosure is not limited thereto. The pixels 410_1 to 410_M, 420_1 to 420_M, 430_1 to 430_M, and 440_1 to 440_M further and respectively include photodiodes 412_1 to 412_M, 422_1 to 422_M, 432_1 to 432_M, and 442_1 to 442_M. The photodiodes 412_1 to 412_M, 422_1 to 422_M, 432_1 to 432_M, and 442_1 to 442_M are respectively and electrically connected with the switches 411_1 to 411_M, 421_1 to 421_M, 431_1 to 431_M, and 441_1 to 441_M.

In the present embodiment, the photodiodes 412_M, 422_M, 432_M and 442_M are not electrically connected with the bias line BL, and other photodiodes are electrically connected with the bias line BL, but the disclosure is not limited thereto. In some embodiments, at least one of the photodiodes 412_1 to 412_M, at least one of the photodiodes 422_1 to 422_M, at least one of the photodiodes 432_1 to 432_M, and at least one of the photodiodes 442_1 to 442_M may be not electrically connected with the bias line BL, and other photodiodes are electrically connected with the bias line BL. The bias line BL is configured to provide an operating voltage to other photodiodes. In other words, in the present embodiment, at least one of the pixels 410_1 to 410_M, at least one of the pixels 420_1 to 420_M, at least one of the pixels 430_1 to 430_M, and at least one of the pixels 440_1 to 440_M may be electrically insulated from the bias line BL so as to provide background noise. However, for an electrical insulation mode of the at least one of the pixels 410_1 to 410_M, at least one of the pixels 420_1 to 420_M, at least one of the pixels 430_1 to 430_M, and at least one of the pixels 440_1 to 440_M from the bias line, reference may be made to a mode of forming a broken circuit on a bias branch line BLS in an active region or a mode of cutting the bias line BL in a peripheral region provided by the embodiment in FIG. 3 above, so that the descriptions thereof are omitted herein.

From another perspective, the plurality of pixels such as pixels 410_M and 430_M are arranged into a first row in an extending direction P1 of the data line. The plurality of pixels such as pixels 410_1 and 430_1 are arranged into a second row in the extending direction P1 of the data line. In the present embodiment, each of the plurality of pixels in the first row includes a switch and a photodiode, for example, the pixel 410_M includes a switch 411_M and a photodiode 412_M. The switch 411_M is electrically connected with the gate line G1, the data line D1_M and the photodiode 412_M. The pixel 410_M is electrically insulated from the bias line BL. In the present embodiment, each of the plurality of pixels in the second row includes a switch and a photodiode, for example, the pixel 410_1 includes a switch 411_1 and a photodiode 412_1. The switch 411_1 is electrically connected with the gate line G1, the data line D1_1 and the photodiode 412_1, and the photodiode 412_1 is also electrically connected with the bias line BL. The pixel 410_1 is electrically connected with the bias line BL.

In the present embodiment, the radiation detection device 400 may obtain a plurality of offsets in the radiation detection process through each of the plurality of pixels in the first row including, for example, the pixels 410_M and 430_M, so as to respectively correct the radiation detection results of the photodiodes of other corresponding pixels. For this reason, the data line D1_M may be used as a background line. In other words, the radiation detection device 400 may, for example, enable the switches 411_M and 431_M of the pixels 410_M and 430_M to only provide a noise signal on a circuit loop to the readout circuit 401 to be used as an offset in a mode of cutting a wire distributed among the pixels 410_M and 430_M and the bias line BL or forming a broken circuit without changing an existing pixel array layout. Additionally, in an embodiment, the radiation detection device 400 may also obtain a plurality of offsets in a mode of arranging a plurality of pixels capable of being disposed into a plurality of rows in an extending direction P1 of the data line to be electrically insulated from the bias line BL, or a mode of arranging a plurality of pixels disposed into a whole row in the extending direction P1 of the data line to be electrically insulated from the bias line BL, but it is not limited thereto.

It is worth noting that the data lines D1_1 to D1_M are electrically connected with the same readout circuit 401, so that identical or similar circuit loop noise is realized among the pixels 410_1 to 410_N, and 430_1 to 430_N. The data lines D2_1 to D2_M are electrically connected with the same readout circuit 402, so that identical or similar circuit loop noise is realized among the pixels 420_1 to 420_M, and 440_1 to 440_M. Therefore, the offsets read out from the switches 411_M and 431_M are applicable to correction of the detection results of the pixels 410_1 to 410_M, and 430_1 to 430_M. Additionally, the offsets read out from the switches 421_M and 441_M are applicable to correction of the detection results of the pixels 420_1 to 420_M, and 440_1 to 440_M.

Additionally, in an embodiment, the pixels 410_1 to 410_M, and 430_1 to 430_M electrically connected to the readout circuit 401 may also include a plurality of pixel designs such as the pixels 410_M and 430_M for obtaining the background noise. In other words, the data lines D1_1 to D1_M may include a plurality of data lines used as the background lines. However, the positions of a plurality of pixels, such as the pixels 410_M and 430_M, designed in the pixels 410_1 to 410_M, and 430_1 to 430_M may be equidistant or non-equidistant or optionally selected. By taking three background lines as examples, a first background line, a second background line and a third background line are electrically connected to the readout circuit 401. A minimum distance between the first background line and the second background line may be identical to a minimum distance between the second background line and the third background line, or the minimum distance between the first background line and the second background line may be different from the minimum distance between the second background line and the third background line. Identically, the pixels 420_1 to 420_M, and 440_1 to 440_M electrically connected to the readout circuit 402 may adopt a circuit layout mode identical to, similar to or different from that of the pixels 410_1 to 410_M, and 430_1 to 430_M electrically connected to the readout circuit 401 according to different use requirements or designs.

Additionally, according to embodiments of the disclosure, an optical microscopy (OM), a scanning electron microscope (SEM) or other proper modes may be adopted to measure a distance of each assembly.

Based on the above, the radiation detection device of the disclosure may provide proper background noise through the pixels without the photodiodes, or may provide proper background noise through the pixels electrically insulated from the bias line in a mode of forming a broken circuit on the bias branch line of at least one pixel in an active region of the detection panel or a mode of cutting the bias line in a peripheral region of the detection panel, so as to effectively obtain the proper background noise.

Finally, it should be noted that the foregoing embodiments are merely used for describing the technical solutions of the disclosure, but are not intended to limit the disclosure. Although the disclosure is described in detail with reference to the foregoing embodiments, a person of ordinary skill in the art should understand that, modifications may still be made to the technical solutions in the foregoing embodiments, or equivalent replacements may be made to part or all of the technical features; and these modifications or replacements will not cause the essence of corresponding technical solutions to depart from the scope of the technical solutions in the embodiments of the disclosure.

What is claimed is:

1. A radiation detection device, comprising:
    a detection panel, comprising a plurality of data lines; a plurality of first pixels, arranged into a first row; a plurality of second pixels, arranged into a second row; and a plurality of other second pixels, arranged into a third row, wherein the first row, the second row and the third row are parallel to an extending direction of one of the data lines,
    wherein each of the plurality of first pixels comprises a first switch, and each of the plurality of second pixels and the plurality of other second pixels comprises a second switch, wherein each of the plurality of second pixels and the plurality of other second pixels comprises a photodiode, and the plurality of first pixels do not comprise a photodiode,
    a first background line of the plurality of data lines, electrically connected with the plurality of first pixels in the first row;
    a first data line of the plurality of data lines, electrically connected with the plurality of second pixels in the second row; and
    a second data line of the plurality of data lines, electrically connected with the plurality of other second pixels in the third row and the second data line being close to the first data line and away from the first background line,
    wherein a minimum distance between the first background line and the first data line is less than a minimum distance between the first data line and the second data line.

2. The radiation detection device according to claim 1, wherein a ratio of the minimum distance between the first data line and the second data line to the minimum distance between the first background line and the first data line is greater than 6.

3. The radiation detection device according to claim 1, further comprising:
    a second background line of the plurality of data lines; and
    a third background line of the plurality of data lines, wherein a minimum distance between the first background line and the second background line is identical to a minimum distance between the second background line and the third background line.

4. The radiation detection device according to claim 1, further comprising:
    a second background line of the plurality of data lines; and
    a third background line of the plurality of data lines, wherein a minimum distance between the first background line and the second background line is different from a minimum distance between the second background line and the third background line.

5. The radiation detection device according to claim 1, wherein the first background line, the first data line, and the second data line are electrically connected to a same readout circuit.

6. A radiation detection device, comprising:
    a detection panel, comprising a plurality of data lines, a bias line, a plurality of first pixels, and a plurality of second pixels,
    wherein the plurality of first pixels and the plurality of second pixels respectively comprise a switch and a photodiode, the plurality of first pixels are electrically insulated from the bias line, and the plurality of second pixels are electrically connected with the bias line,
    a first background line of the plurality of data lines, electrically connected with the plurality of second pixels,
    a second background line of the plurality of data lines, electrically connected with the plurality of other second pixels adjacent to the plurality of second pixels,
    a third background line of the plurality of data lines, electrically connected with the plurality of first pixels,
    wherein the first background line, the second background line and the third background line are electrically connected to a readout circuit, and the readout circuit is configured to read out detection data of the plurality of second pixels, the plurality of other second pixels and the plurality of first pixels through the first background line, the second background line and the third background line,
    wherein the minimum distance between the first background line and the second background line is identical to the minimum distance between the second background line and the third background line.

7. The radiation detection device according to claim 6, wherein the bias line comprises a bias branch line, and the plurality of first pixels are electrically insulated from the bias branch line.

8. The radiation detection device according to claim 6, wherein a first data line and a second data line are electrically connected to the same readout circuit.

* * * * *